United States Patent [19]

Smith, Jr. et al.

[11] Patent Number: 4,746,801
[45] Date of Patent: May 24, 1988

[54] METHOD AND APPARATUS FOR DIFFERENTIATING LOW POROSITY LIMESTONES FROM HIGH POROSITY GAS SANDS

[75] Inventors: Harry D. Smith, Jr., Houston; Michael P. Smith, Spring, both of Tex.

[73] Assignee: Halliburton Company, Duncan, Okla.

[21] Appl. No.: 812,884

[22] Filed: Dec. 23, 1985

[51] Int. Cl.⁴ .............................................. G01V 5/10
[52] U.S. Cl. .................................... 250/270; 250/262
[58] Field of Search ............... 250/270, 262, 264, 269

[56] References Cited

U.S. PATENT DOCUMENTS

4,135,087 1/1979 Oliver et al. ......................... 250/270
4,424,444 1/1984 Smith, Jr. et al. .
4,587,424 5/1986 Grau .................................... 250/270

Primary Examiner—Janice A. Howell
Assistant Examiner—Richard Hanig
Attorney, Agent, or Firm—William J. Beard

[57] ABSTRACT

By taking the ratio of silicon to calcium pulsed neutron capture gamma radiations together with a formation capture cross section measurement, in formations (20) having low hydrogen index, a measurement indicator is provided for differentiating low porosity limestones from high porosity gas sands.

9 Claims, 10 Drawing Sheets

FIG.1

FIG.5 Si/Ca RATIO VERSUS SIGMA (CHOICE 2)

METHOD AND APPARATUS FOR DIFFERENTIATING LOW POROSITY LIMESTONES FROM HIGH POROSITY GAS SANDS

BACKGROUND OF THE INVENTION

The present invention relates to in situ measurements of earth formations traversed by a well borehole. More particularly, the invention relates to pulsed neutron irradiation measurement techniques for in situ differentiation of low porosity limestones from high porosity gas sands.

Pulsed (d,t) sources used in borehole logging produce neutrons which have energies of 14 Mev. These neutrons, when emitted into the borehole, are then moderated by interaction with the nuclei of the materials in the borehole and the surrounding earth formations as the diffuse therethrough. When the neutron energies have moderated to below about 0.05 electron volts, they come into thermal equilibrium with their environment. After reaching this thermal energy range, the neutrons continue diffusing through the formation and borehole until they are captured by nuclei in the constituent materials. The rate at which a zone of material (formation or borehole) captures these thermal neutrons (or more precisely, the probability of capture) is referred to as the macroscopic capture cross-section of the zone. The macroscopic capture cross-section is, in turn, a result of the combined microscopic capture cross-sections of the various constituent elements and materials constituting the zone. The capture cross-section of chlorine for thermal neutrons is considerably higher than that of most other elements commonly encountered in earth formations of interest. Accordingly, thermal neutron macroscopic capture cross-section measurements can give a good indication of the saline content of the fluids in the zone in question. By combining such information about the saline content of the fluids in the pore spaces of an adjacent earth formation with information about the formation water salinity, porosity measurements, and measurements of formation shaliness, information can be derived which can discriminate oil from salt water filled pore spaces in the vicinity of a well borehole.

Since thermal neutrons are absorbed by other materials as well as chlorine, the macroscopic capture cross-section is also responsive to borehole conditions and to the lithology of the formation materials. Prior art thermal neutron cross section methods have therefore typically been structured to try to minimize these effects. Borehole effects have been minimized, for example, by delaying the measurements after each neutron pulse so that these effects could then be ignored, since borehole moderation and die away is usually faster than formation moderation and die away.

U.S. Pat. No. 4,409,481 (Smith, Jr. et al., issued Oct. 11, 1983) and U.S. Pat. No. 4,424,444 (Smith, Jr. et al, issued Jan. 3, 1984), both assigned to the assignee of the present invention, disclose important improvements in such thermal neutron measurements. In these inventions, at least four, and preferably six, capture gamma ray count rate measurements are made starting immediately after thermalization of the fast neutrons. The logging systems which are disclosed in these patents are designed to measure $\Sigma_{FM}$, the thermal neutron capture cross section of the formation, and $\Sigma_{BH}$, the borehole capture cross section. As with prior pulsed neutron systems, a 14 MeV pulsed neutron generator source is used to create a time dependent thermal neutron, and hence capture gamma ray, distribution in the vicinity of two gamma ray detectors within the logging tool. The decay rate of the capture gamma radiation measured by the tool is used to obtain $\Sigma_{FM}$, $\Sigma_{BH}$, and also a number of other parameters useful in evaluating log quality, borehole conditions, and reservoir performance. Reference should also made to the following publications wherein additional aspects of these inventions are discussed: Smith, H. D., Jr., Arnold, D. M., and Peelman, H. E., "Applications of a New Borehole Corrected Pulsed Neutron Capture Logging System (TMD)", Paper DD, SPWLA Twenty Fourth Logging Symposium Transactions, June 1983; and Buchanan, J. C., Clearman, D. K., Heidbrink, L. J., and Smith, H. D., Jr., "Applications of TMD Pulsed Neutron Logs in Unusal Downhole Logging Environments", Paper KKK, SPWLA Twenty Fifth Logging Symposium Transactions, June 1984.

An important practical problem which occurs in neutron logging using dual detector thermal neutron decay measurements is the differentiation of tight formations (i.e., low porosity) from high porosity gas formations: both have very similar neutron parameters (low ratio porosity and low sigma values). It turns out that along the Gulf Coast (and similar sand/shale sequences) naturally occurring low porosity formations are almost always limestones, not sandstones. Hence, a practical means for differentiating high porosity gas sands from low porosity hard streaks would be to determine the relative amounts of sand and limestone present in the formation. Formations that have low ratio porosity and low sigma values simultaneously with a low amount of sand and a high amount of limestone would be rejected, whereas formations with a large amount of sand and a small amount of limestone may be identified as high porosity gas sands of considerable commercial interest. (In the past, such zones have often been overlooked in comparison with the original target, or have developed as a result of production practices.)

Unfortunately, present dual detector thermal neutron decay measurement tools usually cannot make the above differentiation because these formations have similar hydrogen indices and the porosity response of such tools is strongly influenced by the formation hydrogen index.

A need therefore remains for a method and apparatus for extending the operation of such dual detector thermal neutron decay measurement tools to include a relative sandtone versus limestone measurement. Such a method and apparatus should provide a sensitive and accurate indication and means for differentiating between such formations, should be versatile and reliable, and readily suited to use on the widest range of such thermal neutron decay measurement tools.

SUMMARY OF THE INVENTION

Briefly, the present invention meets the above needs and purposes with a new and improved method and apparatus for differentiating low porosity limestones from high porosity gas sands. The invention includes a dual detector thermal neutron decay measurement method and apparatus which use capture gamma spectroscopy to generate a relative sandstone versus limestone Si/Ca ratio measurement. This is a measurement which is provided in addition to the previously furnished thermal neutron decay measurements, quality features, and near/far ratio information of advanced prior art logging tools and methods.

As in the logging tools and methods described in the above U.S. Pat. Nos. 4,409,481 and 4,424,444, the present invention begins by generating, in the well borehole, a relatively short duration discrete burst of fast neutrons, which are then rapidly moderated by interaction with nuclei of the materials in the borehole and surrounding earth formations and slowed down to thermal energy. This creates a thermal neutron population in the borehole and the surrounding earth formations.

Next the radiations representative of the thermal neutron population in the borehole and surrounding earth formations are detected in the borehole in a plurality of time intervals subsequent to the burst of fast neutrons. Corresponding count signals are then generated which are representative of the thermal neutron population during each of the time intervals. During at least one, and preferably several, of these time intervals, counts are also taken of the radiations detected in certain predetermined energy ranges. In the preferred embodiment of the invention, a count signal representative of silicon in and about the borehole is generated by detecting capture gamma radiations in the energy range from substantially 2600 KeV to substantially 4200 KeV. Likewise, a count signal representative of calcium in and about the borehole is generated by detecting capture gamma radiations in the energy range from substantially 4600 KeV to substantially 6300 KeV.

Since calcium and chlorine have very similar capture gamma ray spectra, the calcium signal is really composed of calcium and chlorine signals if the formations contain chlorine. These two elements can be resolved spectrally only with very gain stable NaI detector data, and in addition, only if long count times are used to reduce statistical uncertainties prior to deconvolution. In real time pulsed neutron logging systems employing small diameter tools and detectors, and logging at 10-50 ft/min speeds, with detector systems incapable of high precision gain stabilization, spectral resolution of chlorine and calcium is not practical. However, since chlorine has very high capture cross section relative to most other downhole elements, chlorine and calcium can be differentiated easily using the formation capture cross section, $\Sigma_{FM}$, in combination with Si/(Ca+Cl) obtained from spectral data. If Si/(Ca+Cl) is low due to calcium, $\Sigma_{FM}$ will also be low. If Si/(Ca+Cl) is low due to chlorine, $\Sigma_{FM}$ will be high. It should be noted that the Si(Ca+Cl) signals could also be obtained using spectral deconvolution methods as well as using separate count rate windows (the spectral processing assuming the same spectral shape for Ca and Cl).

Similarly, using known techniques such as described in the above-noted U.S. Pat. Nos. 4,409,481 and 4,424,444 and SPWLA papers, compensation is made for borehole effects and for borehole environmental changes.

The silicon and (calcium+chlorine) count signals are combined by taking the ratio thereof (e.g., Si/(Ca+Cl), hereafter identified as Si/Ca) to generate a lithology indicator ratio which sensitively differentiates low porosity limestones from high porosity gas sands. This ratio measurements, used in combination with a hydrogen index indicator (such as $R_{N/F}$ in the borehole corrected pulsed neutron capture (TMD) log commercially available from the assignee of the present invention), and also with $\Sigma_{FM}$ if chlorine interference needs to be resolved is then repeated at a plurality of different depths in the borehole, and the count signals and measurement indicators for each of the plurality of depths in the borehole is recorded.

It is therefore a feature of the present invention to provide a new and improved borehole logging method and apparatus for differentiating low porosity limestones and high porosity gas sands; such a method and apparatus which provide such differentiation where both the low porosity limestones and the high porosity gas sands have low hydrogen index indicated porosity and $\Sigma_{FM}$ values; which provide such differentiation by first generating, in the borehole, a relatively short duration discrete burst of fast neutrons which are rapidly moderated by interaction with nuclei of materials in the borehole and surrounding earth formations and slowed down to thermal energy, creating a thermal neutron population in the borehole and surrounding earth formations; which detect, in the borehole, radiations representative of silicon in and about the borehole, and generate a silicon count signal representative thereof; which detect, in the borehole, radiations representative of calcium in and about the borehole, and generate a calcium count signal representative thereof; which then combine these count signals according to a predetermined relationship to provide a measurement indicator which differentiates low porosity limestones from high porosity gas sands; which use $\Sigma_{FM}$, the formation capture cross section, as a supplemental indicator of high chlorine concentrations to differentiate changes in Si/Ca due to Ca from changes due to Cl concentrations in formations which contain chlorine (since chlorine and calcium appear spectrally similar using energy windows such as described above); which minimize the sensitivity of Si/Ca to gain shifts by the optimal selection of the Si and Ca energy ranges such that up to 10% gain changes do not significantly affects the observed Si/Ca ratio; and to accomplish the above features and purposes in a sensitive, accurate, uncomplicated, versatile, and reliable method and apparatus readily suited to the widest possible utilization in differentiating between such formations.

These and other features and advantages of the invention will be apparent from the following description, the accompanying drawings, and the appended claims.

DESCRIPTION OF THE PREFERRED EMBODIMENT

With reference to the drawings, the new and improved apparatus for differentiating low porosity limestones from high porosity gas sands, and the method therefor according to the present invention, will be described.

Figure 1:
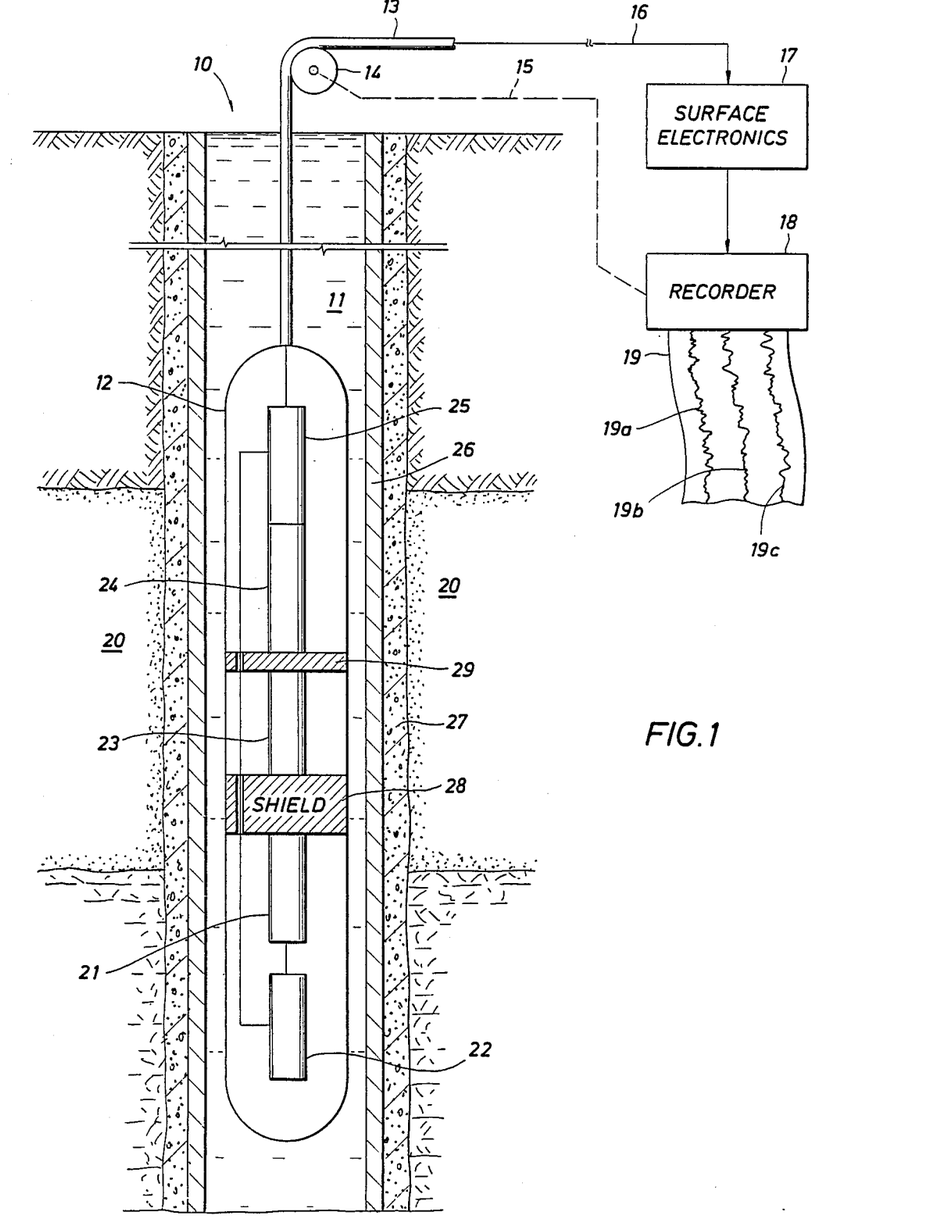
FIG. 1 is a schematic illustration showing a well logging system for performing nuclear earth formation measurements in a borehole according to the present invention.

Referring to FIG. 1, a well logging system in accordance with the concepts of the present invention is illustrated schematically. A well bore-hole 10, which is filled with a borehole fluid 11, penetrates the earth formations 20 under investigation. A downhole well logging sonde 12 is suspended in the borehole 10 via a conventional armored logging cable 13, in a manner known in the art, such that the sonde 12 may be raised and lowered through the bore-hole as desired. The well logging cable 13 passes over a sheave wheel 14 at the surface. The sheave wheel is electrically or mechanically coupled, as indicated by dotted line 15, to a well logging recorder 18 which may comprise an optical recorder, or magnetic tape, or both, as known in the art. Recorder 18 is shown making a record on a conventional paper chart 19 having curves 19a, 19b, and 19c, for example, recorded thereon. The record of measurements made by the downhole sonde 12 may thus be recorded as a function of the depth in the borehole of the sonde 12.

In the downhole sonde 12, a neutron generator 21 is supplied with high voltage (approximately 100 kilovolts) by a high voltage power supply 22. Control and telemetry electronics 25 are utilized to supply control signals to the high voltage supply and the neutron generator 21 and to telemeter information measured by the downhole instrument to the surface via the logging cable 13.

Longitudinally spaced from the neutron generator 21 are two radiation detectors 23 and 24. Radiation detectors 23 and 24 may comprise, for example, thallium activated sodium iodide crystals which are optically coupled to photomultiplier tubes. The detectors 23 and 24 serve to detect gamma radiation produced in the surrounding formations 20 resulting from the action of the neutron generator 21 in emitting neutrons. A neutron shielding material 28 having a high density matter content or large scattering cross-section is interposed between the neutron generator 21 and the dual spaced detectors 23 and 24, in order to prevent direct irradiation of the detectors by neutrons emitted by the neutron generator 21. Shielding 29 may also be interposed between the detectors 23 and 24 if desired.

Upon activation of the neutron generator 21, a burst, or pulse, of neutrons of approximate 60 microseconds duration is initiated and emitted into the well borehole 10, borehole fluid 11, and through the steel casing 26 and cement layer 27 surrounding the steel casing, into the earth formations 20 being investigated. The neutron burst is moderated or slowed down by scattering interactions such that the neutrons are all essentially at thermal energy. The thermalized or thermal neutrons then begin capture interactions with the elemental nuclei of constituents of the borehole and of the adjacent cement and earth formations and the pore spaced contained therein.

The capture of neutrons by nuclei of the borehole, pore space formation elements produces capture gamma rays which are emitted and impinge upon detectors 23 and 24. A voltage pulse whose amplitude is is representative of the gamma ray energy is produced from the respective photomultipliers of detectors 23 and 24 for each gamma ray so detected. These voltage pulses are supplied to the electronics section 25 where they are separated according to energy, counted, and telemetered to the surface via a conductor 16 of the well logging cable 13. At the surface, a surface electronics package 17 detects the telemetered information from the downhole sonde 12 and performs suitable processing, by methods discussed previously herein and below, to determine the measured quantities, which are then supplied to the recorder 18 where they are recorded as a function of borehole depth.

Figure 2:
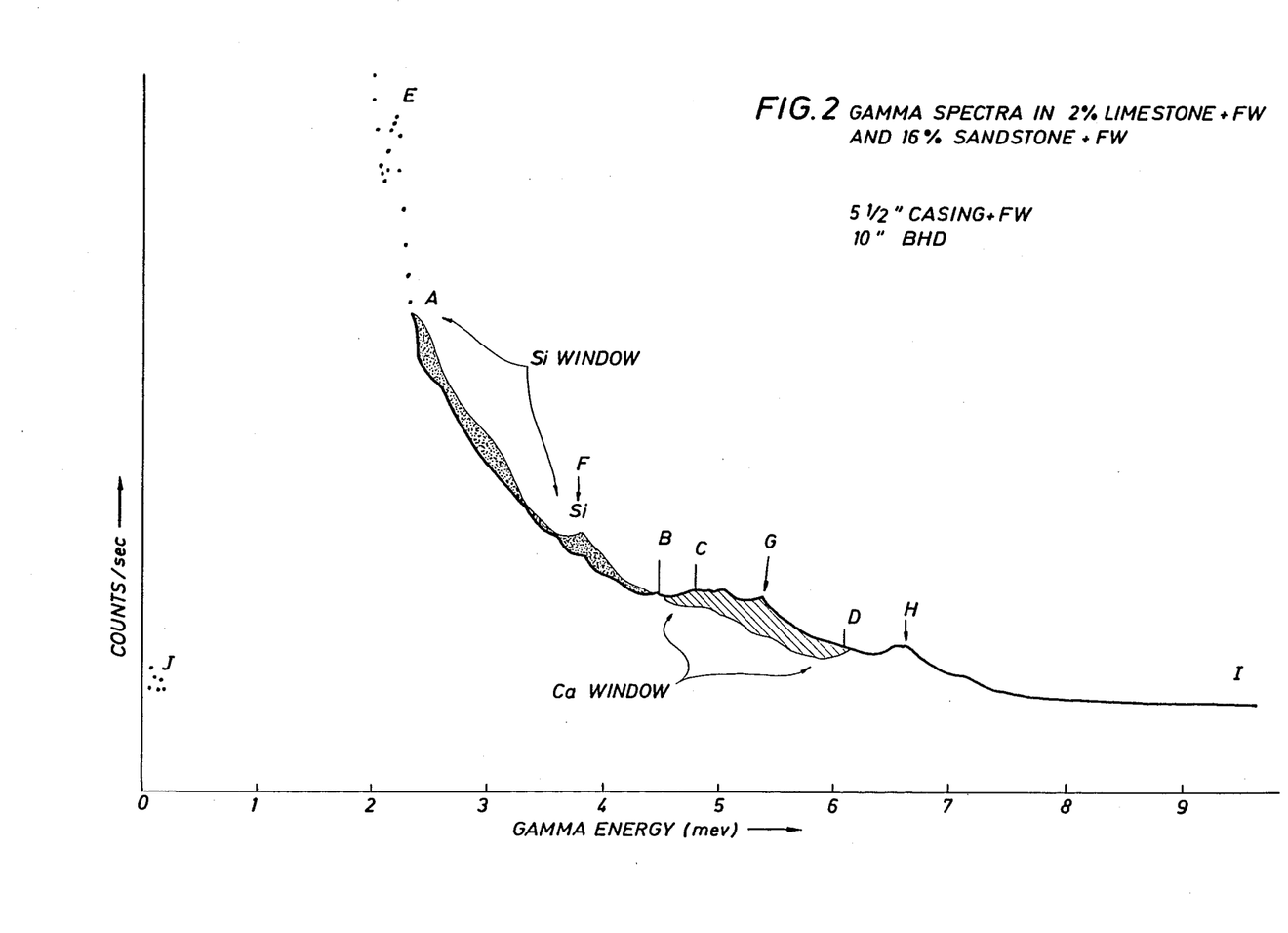
FIG. 2 is a graphical illustration of two superimposed gamma ray spectral, one taken in 16% sandstone and the other in a 2% limestone.

As suggested above, the quantities which are measured include the energies of the detected gamma rays, so that spectral data can be developed and analyzed. To understand better the basis of the present invention, FIG. 2 shows superimposed two near detector spectra recorded in a test tank facility with a standard dual detector thermal neutron decay measurement tool in 16% sandstone+fresh water, and in 2% limestone+-fresh water formations, both with a ½" casing+freshwater in 10" boreholes. These formations have low sigma values (10-11 CU) and are typical of those which are differentiated by the present invention. Spectral data from several time gates has been combined. In some applications this may introduce some borehole dependence, in which case use of only the spectra in time gates more remote from the neutron burst is a viable option. Comparison of Si/Ca ratios in gates nearer to the neutron bursts versus more remote gates may indicate the magnitude of the borehole effect—a bigger difference would means a larger borehole effect. Borehole effects in Si/Ca will be reduced by selection of time gates (for measuring Si/Ca) remote from the burst, in which time intervals most borehole capture events will be minimized. Borehole effects can also be minimized by use of long spaced detector Si/Ca data, since prior results with such spacings indicate smaller relative borehole influences at longer source-to-detector spacings.

In a preferred embodiment, the near detector 23 is a 1"×4" NaI (Tl), so that double escape events are accentuated at high energies. Using "Prompt Gamma Rays from Thermal-Neutron Capture" by Lone, Leavitt and Harrison, from Atomic Data and Nuclear Data Tables, Vol. 26, No. 6, November 1981, the following gamma rays have been positively identified:

| Label | Element | Energy (KeV) | Description |
| --- | --- | --- | --- |
| E | hydrogen | 2223 | photopeak |
| F | silicon | 3912 | double escape from 4934 KeV |
| G | calcium | 5398 | double escape from 6420 KeV |
| H | iron | 6616 | double escape from (7631, |

| Label | Element | Energy (KeV) | Description |
|---|---|---|---|
| | | 7645) KeV | |

Beyond point D (FIG. 2), from H to I, the two spectra are essentially identical. The shaded area in A to B shows predominance of sandstone (silicon) over limestone (calcium) and the hatched area in C to D shows predominance of limestone (calcium) over sandtone (silicon). This is consistent with the above-identified peaks, plus a poorly resolved double escape from the 3539 KeV gamma ray at 2517 KeV in silicon. The shaded and hatched areas also provide a means for estimating energy window locations for measuring Si and Ca in order to develop the lithology indicator ratio Si/Ca.

In order to discriminate low porosity limestone from high porosity gas sands, the Si/Ca ratio should have good statistical significance and be relatively insensitive to spectrum gain shifts that originate in the NaI(Tl) crystal and photomultiplier assemblies as they drift with ambient temperature. For a given energy window selection Si(A,B) and Ca(C,D), with Si and Ca counts-per-second (CPS) in each window, the lithology ratio R=Si/Ca has a 1 standard deviation of:

$$R \cdot \sqrt{\gamma(1/Si + 1/Ca)},$$

where $\gamma$ depends on the logging speed and time constant/depth averaging interval: at 30 ft/min with 3 foot averaging, $\gamma = 1/6$. If ($R_S \pm S$) and ($R_L \pm L$) denote the values/standard deviations of R in 100% sand and 100% limestone, then the signal may be defined by:

$$R_S/R_L - R_L/R_L = R_S/R_L - 1,$$

and its statistical noise may be defined by:

$$\frac{R_S}{R_L} \cdot \sqrt{\left(\frac{S}{R_S}\right)^2 + \left(\frac{L}{R_L}\right)^2}$$

The following table summarizes results from several choices for A,B,C,D (all in KeV):

| CHOICE | A | B | C | D | SIGNAL | NOISE | S/N | STABILITY |
|---|---|---|---|---|---|---|---|---|
| (1) | 2449 | 4523 | 4825 | 6144 | 0.306 | 0.0513 | 5.96 | FAIR |
| (2) | 2638 | 4146 | 4598 | 6258 | 0.257 | 0.0466 | 5.51 | GOOD |
| (3) | 3699 | 4129 | 5205 | 5421 | 0.476 | 0.131 | 3.63 | POOR. |

Figure 6:
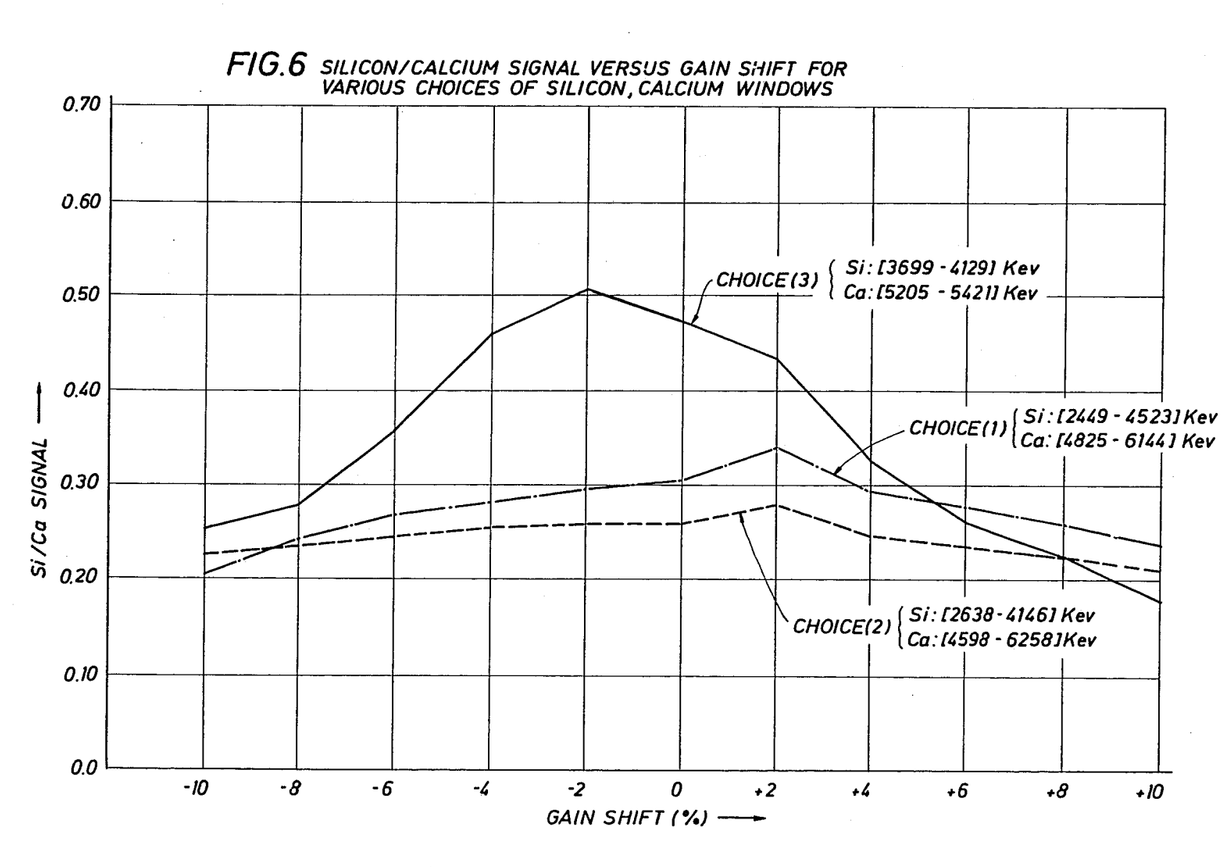
FIG. 6 is a graphical illustration of the Si/Ca signal versus gain shift for several choices of Si and Ca energy windows.
Figure 7:
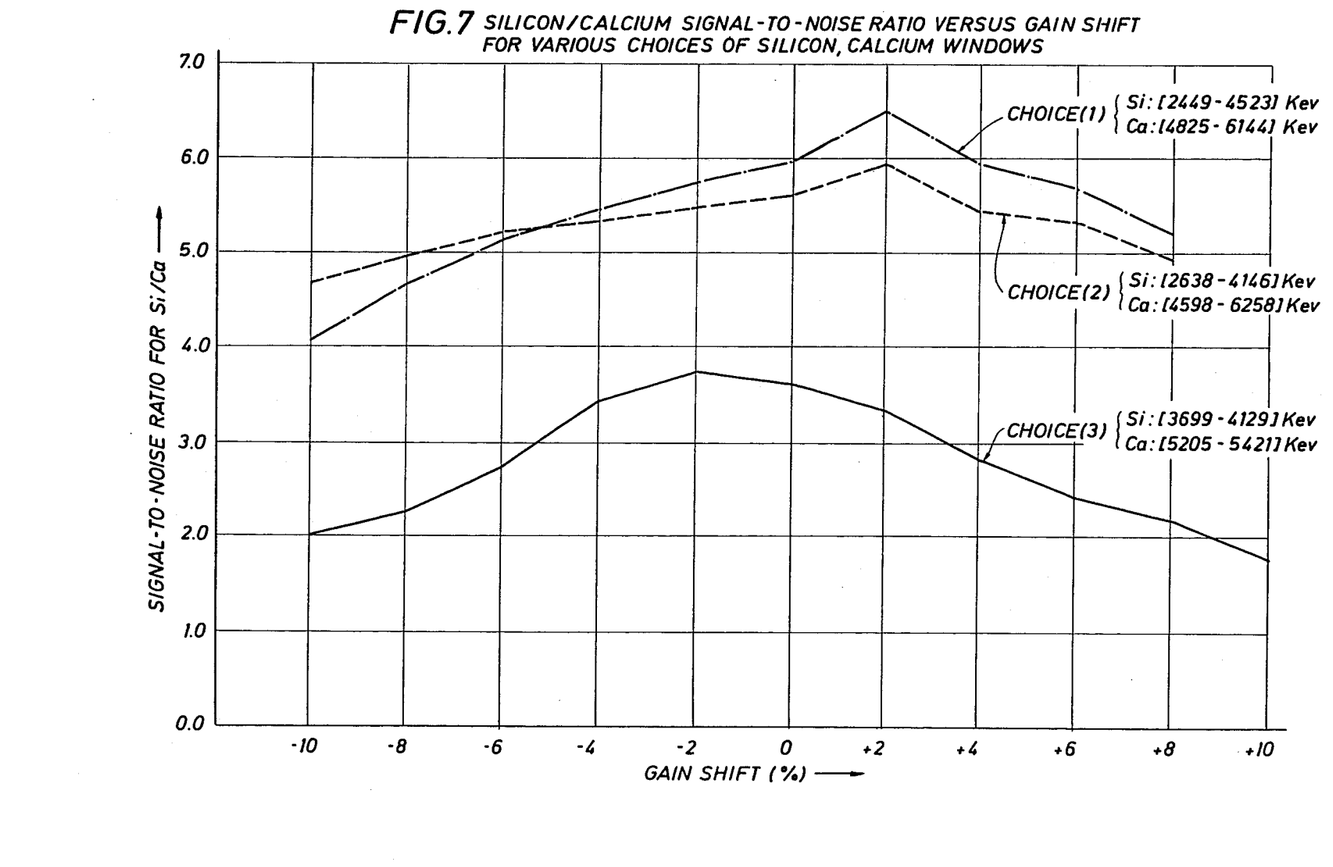
FIG. 7 is a graphical illustration of the Si/Ca signal-to-noise ratio versus gain shift for the same choices of Si and Ca energy windows as in FIG. 6.
Figure 8:
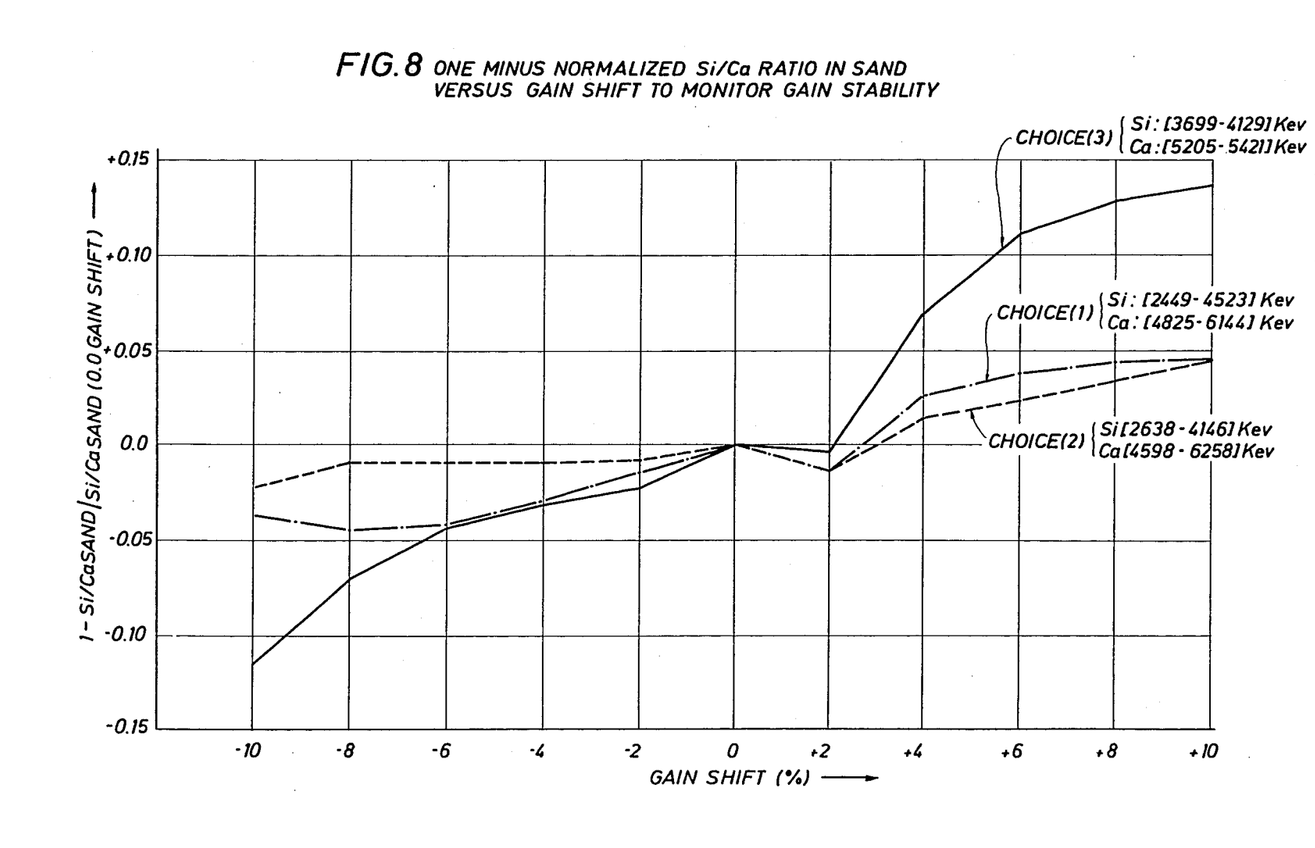
FIG. 8 is a graphical illustration of the one minus normalized Si/Ca ratio in sand versus gain shift for monitoring gain stability for the same choices of Si and Ca energy windows as in FIG. 6.

More complete information on the performance of R=(Si/Ca) as a litholoy indicator in the presence of adverse gain shifts is presented in FIGS. 6, 7, and 8. FIG. 6 shows that very narrow windows do possess good signals, but are very sesitive to gain changes. FIG. 7 shows that narrow windows have poor signal-to-noise ratios, primarily because of large noise levels due to low count rates. FIG. 8 indicates that CHOICE (2) has a sand line that is very insensitive to gain shifts—which is very important to practical logging operations. FIG. 8 clearly shows that narrow windows are generally unsuitable for logging if gain shifts are present.

Figure 3:
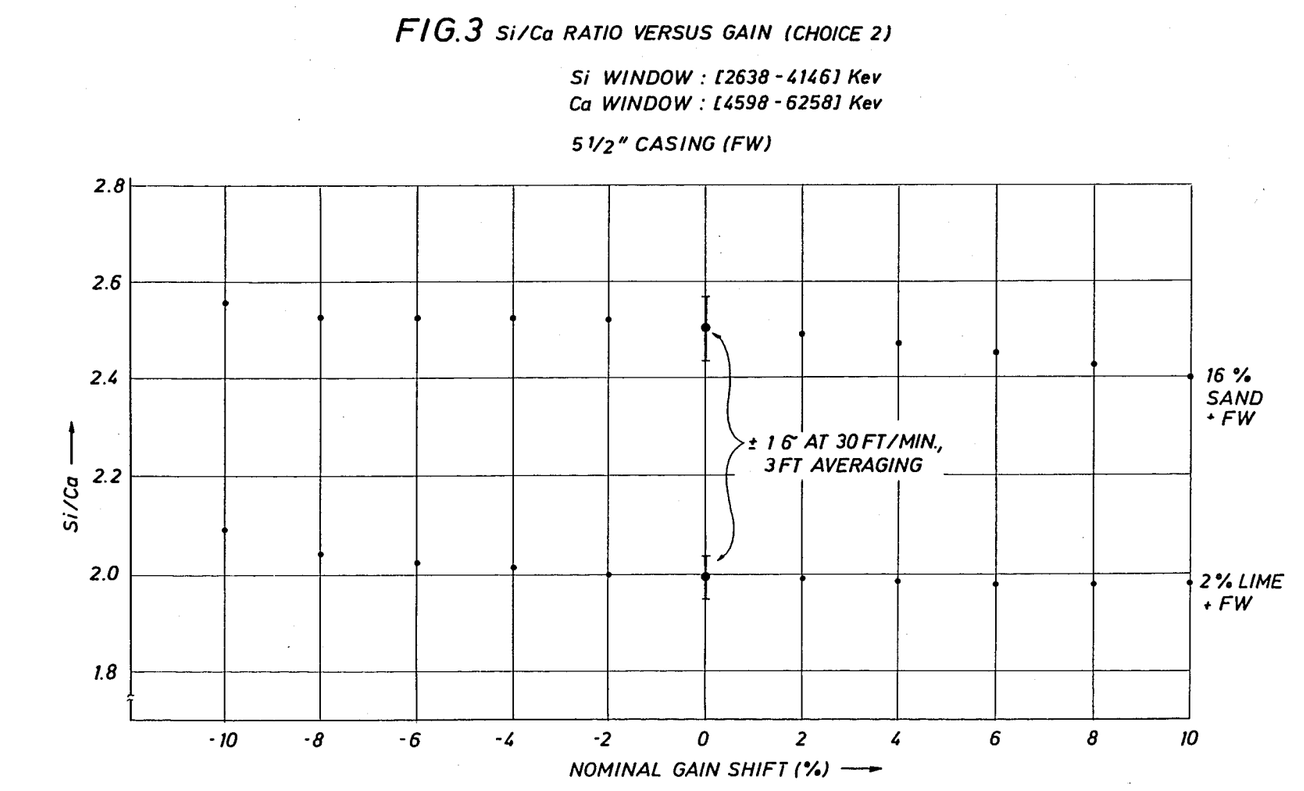
FIG. 3 is a graphical illustration of the Si/Ca ratios versus gain for the two curves shown in FIG. 2, using respective windows of 2638-4146 KeV and 4598-6258 KeV.
Figure 4:
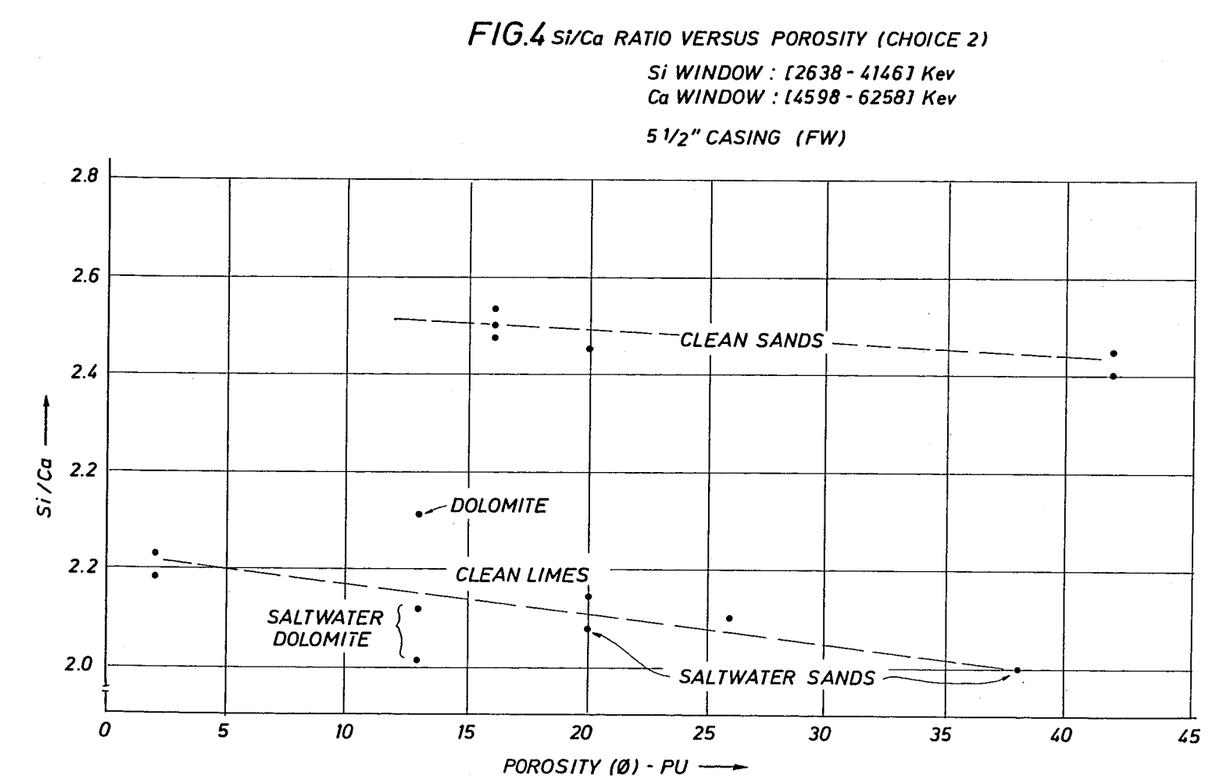
FIG. 4 is a graphical illustration of the Si/Ca ratios versus porosity for various formations.
Figure 5:
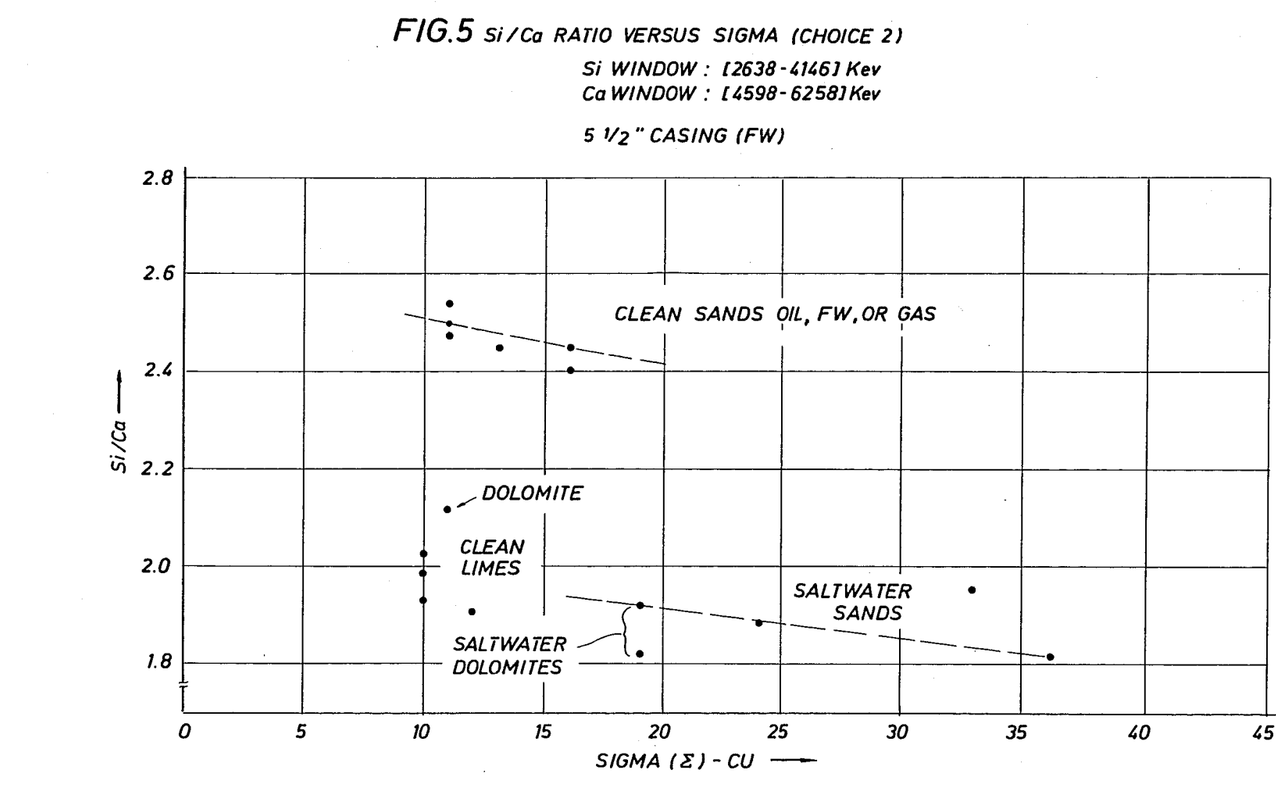
FIG. 5 is a graphical illustration similar to FIG. 4 of the Si/Ca ratios versus sigma for the same formations.

From these discussions it will be seen that compromises must be made between all the desired operational parameters. (The signal is not infinite because only gross windows are used, high energy gamma rays from the tool case are present in both windows, and the spectrometer has relatively low resolution). FIG. 3 shows a plot of Si/Ca versus nominal gain shift for the window choice #(2). This is the choice in the preferred embodiment of the present invention, and is considered best for actual dual detector thermal neutron decay measurement logging operations because of its reasonable signal, low signal, and good gain stability. This compromise could be altered if practical tools can hold a tighter tolerance on the gain stability. With choice #2 (Si:(26-38-4146) KeV, Ca:(4598-6258)KeV) a complete set of test pit data can be used to predict other performance features of R=(Si/Ca) as a discriminator, including salt water (chlorine) interference, presence of boron, dolomitization, borehole diameter effects, and porosity and sigma changes. These are shown in FIGS. 4 and 5, in which R=Si/Ca is plotted versus porosity and sigma. All of this data has a borehole containing a $5\frac{1}{2}^3$ casing filled with fresh water (FW).

Of course, with other tools, refinements, and environments, different window selections, different gate selections, use of far detector radiation to further reduce borehole effects and/or provide a supplemental Si/Ca measurement, and more windows (to remove Fe, Ni, Cr and Cl interferences) may be used without departing from the scope and teachings of the present invention.

Figure 9:
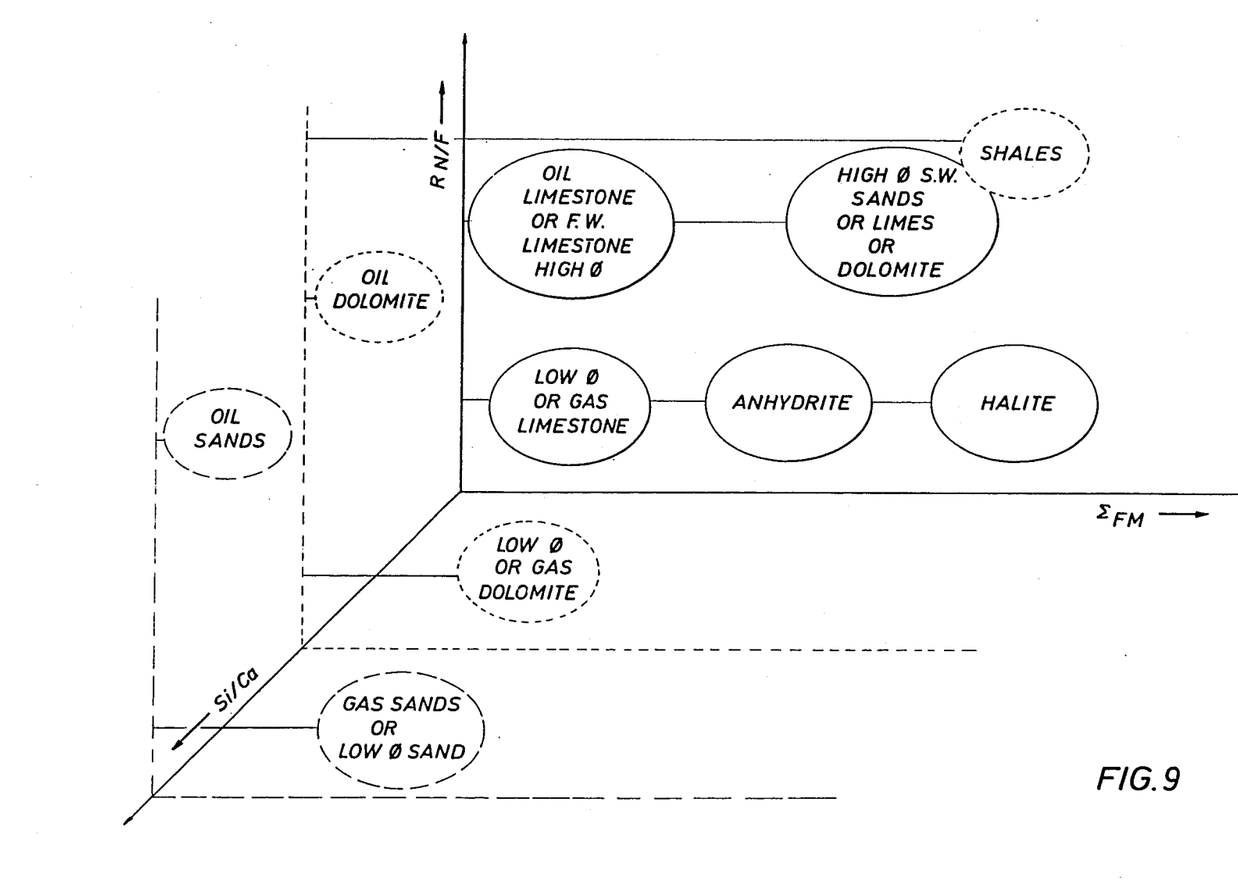
FIG. 9 is a three dimensional interpretation model using Si/Ca, $\Sigma_{FM}$, and a neutron porosity indicating curve ($R_{N/F}$)
Figure 10:
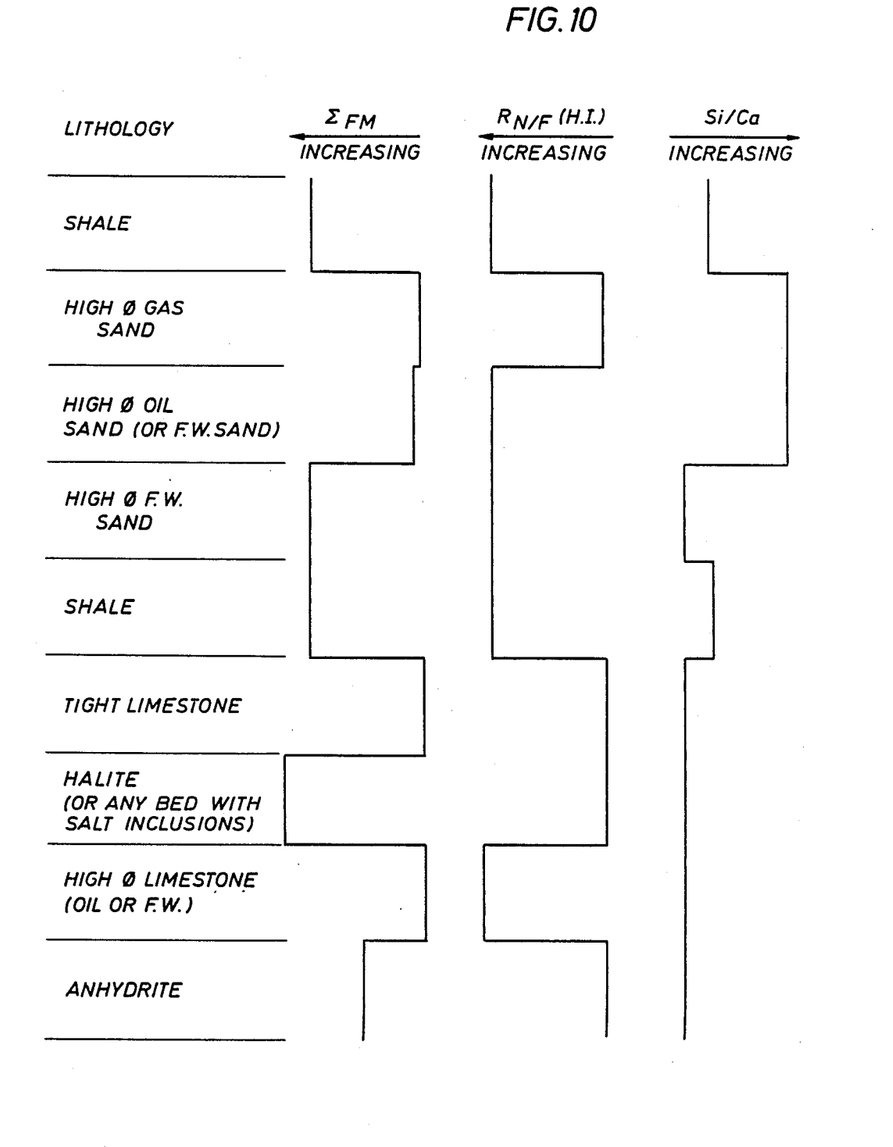
FIG. 10 is a hypothetical log in which all three ($R_{N/F}$, Si/Ca, and $\Sigma_{FM}$) curves are observed to vary as they would in an actual borehole environment, to differentiate the various downhole formations present.

A glance at FIGS. 4 and 5 shows that clean sands and clean limestones can easily be differentiated—one feature of the present invention. Closer inspection shows that a very significant salt-water (sigma) effect is also present. This is caused by chlorine, which is a strong neutron absorber that generates considerable capture gamma radiation throughout the gamma spectrum, with a spectral shape similar to that of calcium. Hence the Si/Ca ratio is really a Si/(Ca+Cl) ratio. It is possible to differentiate calcium and chlorine via the $\Sigma$ curve itself. Chlorine has a high capture cross section; calcium a relatively low capture cross section. Hence a cross-plot of $\Sigma$vs. Si/Ca will differentiate Si/Ca changes due to calcium from those due to chlorine. Any borehole dependence in Si/Ca can be minimized via the crossplot by using the relative position of the points as shown, and also by spectrally processing only during time intervals remote from the neutron bursts. In FIG. 5, below ~17cu, R=Si/Ca cleary differentiates sand and limes. Thus, in the preferred embodiment, both R=Si/Ca, and $\Sigma_{FM}$ corrected for spacing effects, are used to discriminate between low porosity limestones and high porosity gas sands, with a hydrogen index responsive measurement (such as the TMD $R_{N/F}$ curve) indicating the potential zones of interest. The ability of the combination of $f_M$, Si/Ca, and a neutron porosity input (such as $R_{N/F}$) to differentiate gas sands from low porosity limes is illustrated in FIG. 9 in an x,y,z crossplot of these three parameters. Clearly the gas sands, having low $\Sigma_{FM}$, low $R_{N/F}$, and high silica can be uniquely identified. The same information can be displayed in a log overlay of these three curves, as shown in FIG. 10, where gas sands are uniquely identified when all three curves deflect to the right. It may also be seen dolomitization will not stop the discriminating ability of Si/Ca. Boron effects are also small.

As may be seen, therefore, the techniques of the present invention have numerous advantages. They provide a highly effective method and apparatus for differentiating low porosity limestones from high porosity gas sands, even in formations containing chlorine. They furnish the means whereby high quality dual detector thermal neutron decay measurement tools can utilize an effective borehole signal measurement not only to provide intrinsic sigma measurements, but also to correct R=Si/Ca for borehole environmental changes. As taught by the present invention, a dual detector thermal neutron decay measurement tool with a Si/Ca ratio can perform the above differentiation without using sophisticated capture gamma deconvolution spectroscopy, while retaining all of the thermal neutron decay measurements, quality features, and near/far ratio information. The invention thus furnishes an accurate, uncomplicated, versatile, and reliable method and apparatus readily suited to the widest possible utilization in differentiating between such formations in pulsed neutron borehole logging operations.

While the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. A borehole logging method for differentiating low porosity limestones from high porosity gas sands, comprising:

(a) generating, in the borehole, a plurality of repetitive relatively short duration discrete bursts of fast neutrons which are rapidy moderated by interaction with nuclei of materials in the borehole and surrounding earth formations and slowed down to thermal energy, creating a repetitive succession of thermal neutron populations in the borehole and surrounding earth formations, (b) detecting during the interval between neutron bursts at least at two spaced locations from said neutron generating location gamma radiation attributable to the capture of thermal neutrons by the nuclei of elemental constituents of substances in the borehole and in the earth formation in the vicinity of the borehole and generating count rate signals representative thereof, (c) combining said count rate signals measured at least at one of said two spaced locations according to a predetermined relationship to derive at least one measurement signal representative of a thermal capture cross section of the earth formation medium in the vicinity of the borehole, (d) combining at least some of said representative count rate signals detected at each of said two spaced locations from said neutron generating location to obtain a ratio signal indicative of formation hydrogen index, (e) detecting, in the borehole, gamma radiations and separating therefrom by energy discrimination gamma radiation representative of silicon in and about the borehole and generating a silicon count signal representative thereof, (f) detecting, in the borehole, gamma radiations and separating therefrom by energy discrimination gamma radiations representative of calcium and chlorine in and about the borehole and generating a calcium plus chlorine count signal representative thereof, and (g) combining the silicon and calcium plus chlorine representative count signals according to a predetermined relationship and using said combined signals together with said hydrogen index indicating signal and said earth formation thermal neutron capture cross section representative signal used as a direct indicator of chlorine content of the earth formations to provide a measurement indicator signal differentiating low porosity limestones from high porosity gas sands.

2. The method of claim 1 wherein:
   (a) the silicon count signal is generated by detecting and separating gamma radiations in the energy range from substantially 2600 KeV to substantially 4200 KeV, and
   (b) the calcium count signal is generated by detecting and separating gamma radiations in the energy range from substantially 4600 KeV to substantially 6300 KeV.

3. The method of claim 1 further comprising differentiating between those portions of the calcium count signal which are attributable to calcium and those which are attributable to chlorine, and compensating for the portion of the signal attributable to chlorine.

4. The method of claim 3 wherein said step of compensating for the portion of the signal attributable to chlorine further comprises compensating by using said formation component thermal neutron cross section measurement as a direct chlorine indicator.

5. The method of claim 1 further comprising reducing borehole effects and borehole environmental sensitivity by performing said detecting and separating by energy discrimination steps in time intervals removed from the neutron bursts by a predetermined amount which reduces relative borehole component count rates to relatively low levels.

6. The method of claim 1 further comprising repeating all of the steps at a plurality of different depths in the borehole and recording the count signals, the hydrogen index indicator, and the thermal neutron characteristic signals and the measurement indicator signal for each of the plurality of depths in the borehole.

7. The method of claim 1 wherein said generating step is performed using a source of approximately 14 MeV neutrons generated by a deuterium-tritium type accelerator tube.

8. The method of claim 1 wherein said hydrogen index indicating signal is made simultaneously with the formation and borehole component thermal neutron cross section and silicon and calcium measurements.

9. A borehole logging method for differentiating low porosity limestones from high porosity gas sands, where both have low indicated porosity and sigma values, comprising:

(a) generating, by using a source of approximately 14 MeV neutrons generated by a deuterium-tritium type accelerator tube in the borehole, a plurality of repetitive discrete bursts of fast neutrons which are rapidly moderated by interaction with nuclei of materials in the borehole and surrounding earth formations and slowed down to thermal energy, creating a repetitive succession of thermal neutron populations in the borehole and surrounding earth formations, (b) detecting in at least four separate time sub intervals substantially spanning the time interval between said repetitive neutron bursts and at least at two spaced locations from said neutron generating location gamma radiations attributable to the capture of thermal neutron by the nuclei of elemental constituents of substances in the borehole and in the vicinity of the borehole and generating count rate signals representative thereof, (c) combining said at least four representative count rate signals measured at least at one of said two spaced locations in an iterative process according to a predetermined relationship to simultaneously separate the borehole and formation decay components and to derive at least two measurement signals representative of a thermal neutron decay characteristic of the borehole medium and the earth formation medium in the vicinity of the borehole, (d) combining at least some of said representative count rate signals detected at each of said two spaced locations from said neutron generating location to obtain a ratio signal indicative of hydrogen index, (e) detecting, in at least one of said spaced locations in the borehole, thermal neutron capture gamma radiations in the energy range from substantially 2600 KeV to substantially 4200 KeV, which are representative of silicon in and about the borehole, and generating a silicon count signal representative thereof, (f) detecting, in at least one of said spaced locations in the borehole, thermal neutron capture gamma radiations in the energy range from substantially 4600 KeV to substantially 6300 KeV, which are representative of calcium in and about the borehole, and generating a calcium count signal representative thereof, (g) differentiating between those portions of the calcium count signal which are attributable to calcium and those which are attributable to chlorine, and compensating for the portion of the signal attributable to chlorine, by using a formation thermal neutron capture cross section measurement as a direct chlorine indicator, (h) reducing borehole effects and borehole environmental sensitivity by performing said detecting and energy discrimination steps in time intervals removed from the neutron bursts by a predetermined amount which reduces relative borehole count rates to relatively low levels, (i) combining the silicon and calcium representative count signals by taking the ratio thereof together with said hydrogen index indicating signal to generate a lithology indicator ratio differentiating low porosity limestones from high porosity gas sands, and (j) repeating said preceding steps at a plurality of different depths in the borehole and recording at least the silicon and calcium representative count signals and the measurement indicator for each of the plurality of depths in the borehole.

* * * * *